Aug. 29, 1961 R. L. KOOIKER ET AL 2,998,123
GEAR CASE FOR SCREW CONVEYOR
Filed May 26, 1958 2 Sheets-Sheet 1
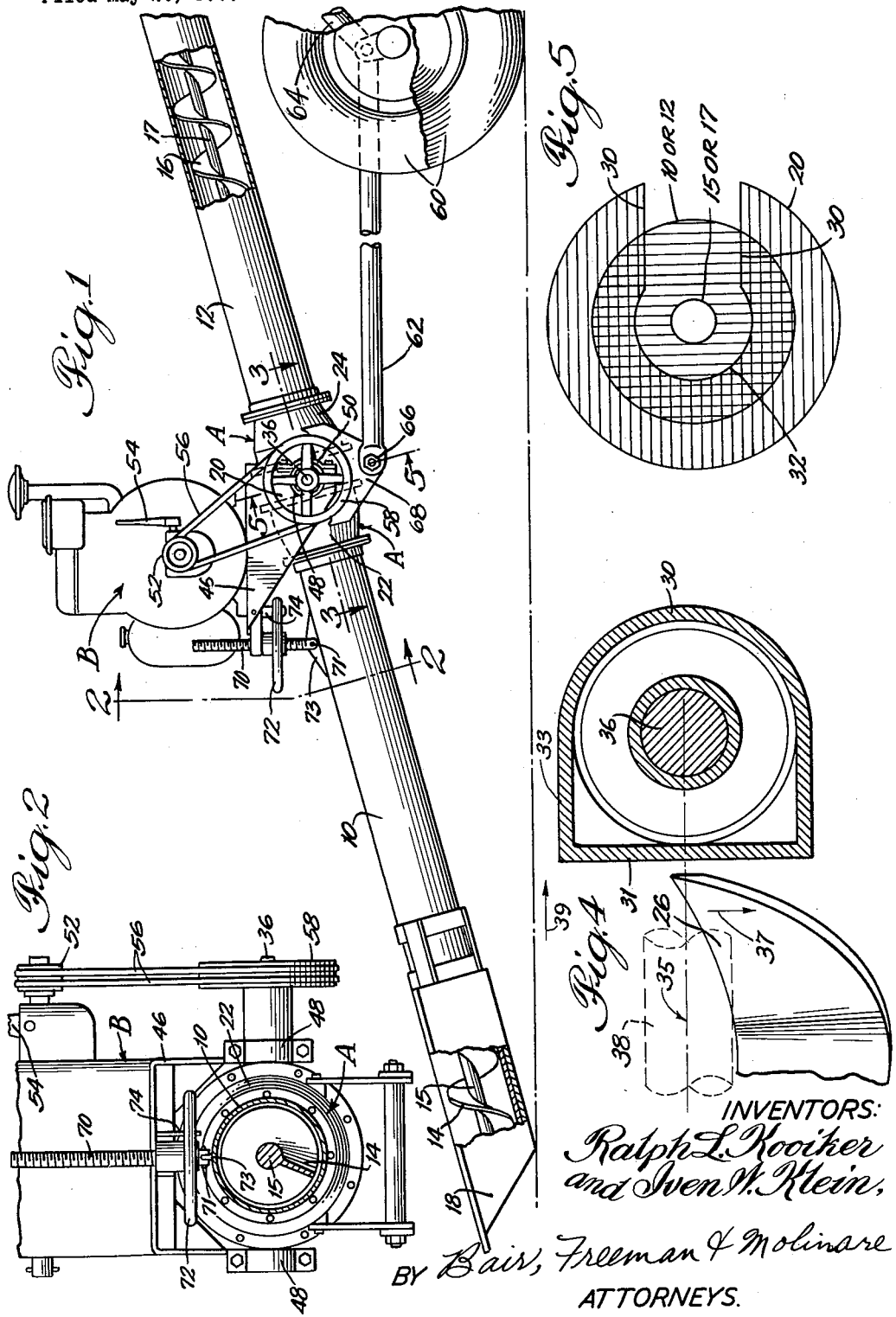
INVENTORS:
Ralph L. Kooiker
and Iven N. Klein,
BY Bair, Freeman & Molinare
ATTORNEYS.

Aug. 29, 1961  R. L. KOOIKER ET AL  2,998,123
GEAR CASE FOR SCREW CONVEYOR
Filed May 26, 1958  2 Sheets-Sheet 2

INVENTORS:
Ralph L. Kooiker
and Iven W. Klein
BY Bair, Freeman & Molinare
ATTORNEYS.

United States Patent Office 2,998,123
Patented Aug. 29, 1961

2,998,123
GEAR CASE FOR SCREW CONVEYOR
Ralph L. Kooiker, Hull, Iowa, and Iven W. Klein, Sioux Falls, S. Dak., assignors to The Sioux Steel Co., Sioux Falls, S. Dak., a corporation of Delaware
Filed May 26, 1958, Ser. No. 737,836
2 Claims. (Cl. 198—213)

This invention relates to a gear case and more particularly one that is suitable for interposition in an auger housing through which an auger elevates grain or the like and which includes a drive arrangement internally for the elevator auger.

One object of the invention is to provide a novel arrangement of gear cases wherein suitably housed gears are provided for driving an auger drive shaft extending axially therethrough, from a main drive shaft that projects laterally from the side of the gear case, means being provided within the gear case for transferring the grain or other commodity being elevated therethrough from the intake to the outlet end of the gear case without substantial interference to the flow of grain by the gear housing at the center of the gear case and a housing for the main drive shaft which must of necessity extend from the gear housing to the outer wall of the gear case.

Another object is to provide a gear case which constitutes an enlargement of an elevator housing in order to accommodate driving gears therein and to provide within the gear case an impelling auger and a receiving auger for effectively elevating grain through such enlargement from an auger below the enlargement to one thereabove.

Still another object is to provide the impelling auger and the receiving auger of conical form so as to closely sweep the interior of the enlarged gear case and effectively elevate the grain past the lateral main drive shaft housing within the gear case.

A further object is to provide the main drive shaft housing of suitable cross-sectional shape within the gear case so as to minimize clogging of the grain as it is discharged from the impelling auger for reception by the receiving auger.

Still a further object is to provide the gear case enlarged in relation to the auger housing sufficiently to prevent jamming of the grain therein, and accommodate the gears for transferring rotation from the laterally extending main drive shaft to the axially extending auger drive shaft.

An additional object is to provide an engine mounting on the gear case so arranged that the auger housing constituting the elevator may be adjusted to various angles of inclination and the engine housing readjusted to a substantially level position.

With these and other objects in view, our invention consists in the construction, arrangement and combination of the various parts of our gear case, whereby the objects above contemplated are attained, as hereinafter more fully set forth, pointed out in our claims and illustrated in detail on the accompanying drawings, wherein:

FIG. 1 is a side elevation of a gear case embodying our invention and showing it interposed in a typical grain elevator and driven from an internal combustion engine;

FIG. 2 is a sectional view on the line 2—2 of FIG. 1 and shows a portion of the engine in elevation;

FIG. 4 is a detailed section on the line 4—4 of FIG. 3; and

FIG. 5 is a diagrammatic view of relative free areas through an auger housing and our gear case and corresponds to a section on the line 5—5 of FIG. 1.

Figure 3:
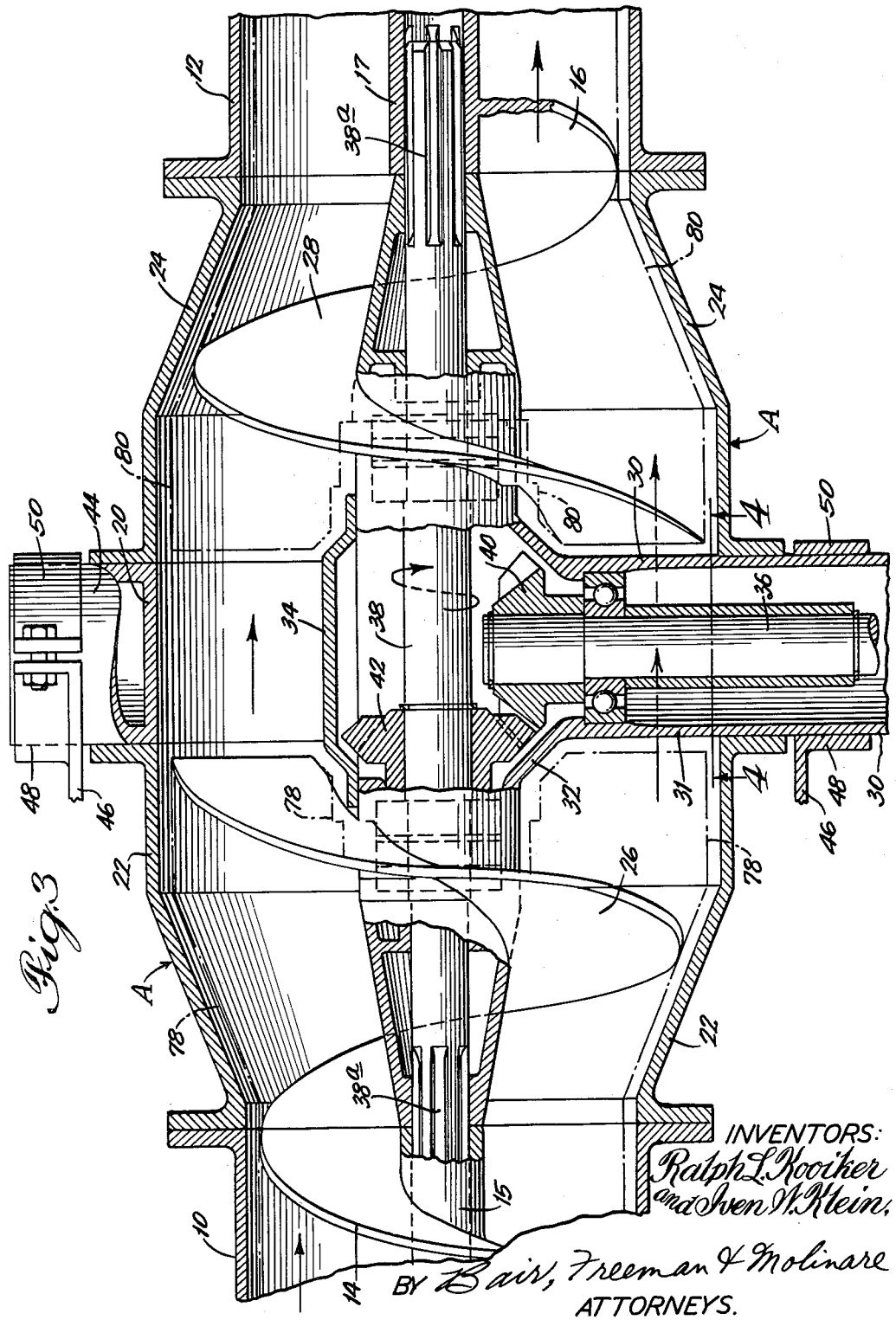
FIG. 3 is an enlarged sectional view on the line 3—3 of FIG. 1 showing internal details of construction in the gear box.

On the accompanying drawings we have used the reference numeral 10 to indicate a lower auger housing and 12 an upper auger housing which constitute a grain elevator, the augers therein being indicated as 14 and 16 respectively and the element 18 being a receiving dipper for the auger 14.

We interpose between the auger housings 10 and 12 our gear case indicated generally at A and comprising a center section 20 and a pair of generally conical end sections 22 and 24. The gear case sections 20, 22 and 24 constitute an enlargement in the elevator housing 10—12 to contain the necessary gears for internally driving the augers 10 and 12 as well as an impelling auger 26 and a receiving auger 28.

The center section 20 includes a sleeve 30 which constitutes a main drive shaft housing to contain a main drive shaft 36 suitable journalled therein. The inner end of the sleeve 30 terminates in a gear housing 32 having a cover plate 34, and within which are meshing bevel gears 40 and 42. The bevel gear 40 is secured to the main drive shaft 36, and an auger drive shaft 38 at right angles to the main drive shaft 36 is suitably journalled in the gear housing 32 as illustrated in FIG. 3 and has the bevel gear 42 secured thereto. The ends of the shaft 38 are splined indicated at 38$^a$. The augers 14 and 16 wind around shafts 15 and 17 respectively which are operatively connected to the opposite ends of the auger drive shaft 38 by being splined to the ends 38$^a$ thereof as illustrated.

A stud 44 projects from the gear case A at a position opposite from the sleeve 30, and an engine bracket 46 is mounted thereon by means of a pair of hubs 48 rotatable on the sleeve 30 and the stud 44. The hubs are retained thereon by hub caps 50. An engine B is mounted on the engine bracket 46 and has a double, V groove engine pulley 52 controlled by a suitable clutch, the handle of which is shown at 54. A pair of belts 56 connect the pulley 52 with a double main shaft pulley 58 on the main drive shaft 36.

The usual pair of elevator supporting wheels 60 are shown connected with the gear case A by a frame member 62 pivoted at 66 to a pivot bracket 68 thereof. Another frame member 64 extends in the opposite direction for adjustable connection with the auger housing 12 in the usual manner so that the elevation and inclination of the elevator are variable to suit all elevating jobs.

An adjusting rod 70 is pivoted at 71 to a bracket 73 and is threaded through an adjusting hand wheel 72 which is rotatably mounted on the engine bracket 46. The elevator 10—12 is adjustable as to inclination by manipulating the frame members 62 and 64 and when so adjusted the engine B may be out of level so can be readjusted to a level position by manipulation of the hand wheel 72. After adjustment, a hand wheel stop 74 may be swung down to a position between the spokes of the wheel to retain the adjustment.

Since some room is taken up within the gear case A by the portion of the sleeve 30 therein and the gear housing 32, it is necessary to have the gear case enlarged in diameter relative to the diameter of the auger housings 10 and 12 as any restriction as by 30 and 32 tends to clog the grain. We have actually found that the enlargement should be considerable, so that the area within the section 20, excluding the area of the gear housing 32 and the portion of the sleeve 30 within the diameter of the section 20, is about one and one-half times the internal area of the housing 10 or 12. This is shown diagrammatically in FIG. 5 with horizontal shading illustrating the one area and vertical shading the other area. It will be noted that the horizontally shaded area is approximately one and one-half times the vertically shaded area.

Such enlargement of the gear case A also poses another problem and that is the proper impelling and receiving of grain through the gear case, and we have provided for this by making the sweep outline of the impelling and receiving augers 26 and 28 as indicated by dot-and-dash lines at 78 and 80 respectively. Also, where the flights of the augers 26 and 28 surround the bearings in the ends of the gear housing 32, it will be noted that the sweep is such as to come as close as reasonably possible throughout the extent of the edge of the flight without danger of the parts striking during operation.

Another important consideration we have found to be the cross-sectional shape of that portion of the housing 30 extending from the gear housing 32 to the periphery of the center section 20. When this cross section is the usual shape (round), there is a tendency for the grain to clog (the flow of course being in the right-hand direction in FIG. 3). But, when the upstream face 31 thereof is substantially flat and at substantially right angles to the axis of rotation 35 of the shaft 38 as illustrated in FIG. 4, and when the advance face 33 of the housing 30 adjacent the face 31 is likewise substantially flat and substantially parallel to the axis of rotation 35, such clogging is eliminated. A section of the shaft 38 is shown dotted in FIG. 4 to illustrate the relationship of elements and the axis 35, and the direction of movement of the adjacent auger flight 26 is indicated by the arrow 37 while the grain flow direction is indicated by the arrow 39. The action, of course, is for the impelling auger 26, due to its cone shape, to expand the substantially tubular cross section of the grain flowing from the housing 10 into the housing 22 and project it past the sleeve 30 and through the intervening space from the housing 22, through the housing 20 and into the housing 24 where it is picked up by the receiving auger 28 and carried into the auger 16 downstream from the gear case A. By properly enlarging the housing 22—20—24 relative to the housings 10 and 12 and making the cross-sectional shape of the sleeve 30 as illustrated in FIG. 4, we find there is maximum tendency for the grain to flow freely without clogging.

Some changes may be made in the construction and arrangements of the parts of our gear case without departing from the real spirit and purpose of our invention, and it is our intention to cover by our claims any modified forms of structure or use of mechanical equivalents which may reasonably be included within their scope.

We claim as our invention:

1. A gear case for interposition in an auger housing comprising a central section of larger diameter than said auger housing and conical end sections forming a transition from the diameter of the auger housing to the maximum diameter of the gear case, an auger drive shaft extending longitudinally through said gear case, a main drive shaft extending laterally therefrom, a housing therefor, gear connections between said shafts, a gear housing therefor, an impelling auger in said gear case between the incoming auger of said auger housing and said main drive shaft housing, and a receiving auger therein between said main drive shaft housing and the outgoing auger of said auger housing, said impelling and receiving augers having sweeps that closely follow the interior contour of said gear case, at least that one-fourth of said laterally extending main drive shaft housing, on the upstream and advance sides thereof having substantially flat surfaces at substantially right angles to each other, said upstream surface being at substantially right angles to the axis of rotation of said impelling auger and said advance surface being substantially parallel to said axis, and the terminal edge of said impelling auger passing relatively close to said upstream surface.

2. A gear case for interposition in an auger housing comprising a central section of larger diameter than said auger housing and conical end sections forming a transition from the diameter of the auger housing to the maximum diameter of the gear case, an auger drive shaft extending longitudinally through said gear case, a main drive shaft extending laterally therefrom, a housing therefor, gear connections between said shafts, a gear housing therefor, an impelling auger in said gear case between the incoming auger of said auger housing and said main drive shaft housing, and a receiving auger therein between said main drive shaft housing and the outgoing auger of said auger housing, said impelling and receiving augers having sweeps that closely follow the interior contour of said gear case, said laterally extending main drive shaft housing, on the upstream side thereof being substantially flat and at substantially right angles to the axis of rotation of said impelling auger, the advance side of said laterally extending main drive shaft housing adjacent said upstream side thereof being substantially flat and substantially parallel to said axis, and the terminal edge of said impelling auger passing closely adjacent said upstream side of said laterally extending main drive shaft housing.

References Cited in the file of this patent

UNITED STATES PATENTS 2,769,526    Herscovitch _____ Nov. 6, 1956